United States Patent
Jinnai

(10) Patent No.: US 6,582,190 B2
(45) Date of Patent: Jun. 24, 2003

(54) VARIABLE-CAPACITY TURBINE

(75) Inventor: Yasuaki Jinnai, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/853,680

(22) Filed: May 14, 2001

(65) Prior Publication Data
US 2001/0053325 A1 Dec. 20, 2001

(30) Foreign Application Priority Data
May 22, 2000 (JP) ........................................ 2000-150497

(51) Int. Cl.[7] ............................................... F04D 17/16
(52) U.S. Cl. .......................... 415/164; 415/150; 60/602
(58) Field of Search ................................. 415/150, 163, 415/164, 165, 166; 60/602

(56) References Cited

U.S. PATENT DOCUMENTS

| 4,726,744 A | * | 2/1988 | Arnold ........................ 415/164 |
| 6,050,775 A | * | 4/2000 | Erdmann et al. ............ 415/164 |
| 6,397,597 B1 | * | 6/2002 | Gartner ....................... 415/164 |

FOREIGN PATENT DOCUMENTS

| JP | 60-116830 A | * | 6/1985 | ................ 415/165 |
| JP | 60-198306 A | * | 10/1985 | ................ 415/165 |

* cited by examiner

Primary Examiner—Christopher Verdier
(74) Attorney, Agent, or Firm—Wenderoth, Lind & Ponack, L.L.P.

(57) ABSTRACT

A variable-capacity turbine provided with a nozzle adjustment mechanism having a nozzle drive component, a lever and nozzle vanes, all housed at the inner side of a scroll in a turbine casing. This reduces the axial length of the turbine and makes it more compact, and thus easier to install in a car. It also avoids the problem of the center casing becoming too complex. There are fewer assembly and disassembly processes, and the turbine is easier for maintenance. This variable-capacity turbine has a nozzle drive member for the nozzles which is connected to an actuator that causes the drive member to rotate around the shaft turbine and a nozzle adjustment mechanism which includes a number of connectors to link the nozzle drive member to the nozzle vanes. The nozzle adjustment mechanism, which comprises the nozzle drive member and the connectors, is installed in the link chamber provided inside the scroll, and the link chamber providing the nozzle adjustment mechanism is provided at the gas outlet side of the nozzle vanes.

2 Claims, 6 Drawing Sheets

VARIABLE-CAPACITY TURBINE

BACKGROUND OF THE INVENTION

1. Field of the Invention

This invention concerns a radial-flow variable-capacity turbine which may be used as a supercharger (an exhaust turbocharger) for an internal combustion engine. This type of radial-flow variable-capacity turbine is so constructed that the operating gases pass through a number of variably angled nozzle vanes from a coil-shaped scroll in the turbine casing, and the gases are made to flow to the turbine rotor so that they drive the rotation of the rotor.

2. Description of the Related Art

In recent years, if an internal combustion engine has a supercharger, it has become more and more common for it to be the kind of supercharger with a variable-capacity turbine. Such a turbine varies the flow rate of the exhaust gases transported from a coil-shaped scroll to the turbine rotor according to the operating state of the engine, and it does this variation in such a way as to match the flow rate of the engine exhaust gases to that rate which would produce the optimal operating condition of the supercharger.

FIG. 5 shows an example of a supercharger with a variable-capacity turbine belonging to the prior art. FIGS. 6 and 7 show how a link plate 3, lever 1 and nozzle vane 2 are connected. FIG. 6 is a partial frontal cross section (taken at a right angle with respect to the shaft of the turbine). FIG. 7 is a cross section taken along line B—B in FIG. 6.

In these drawings, 10 is a turbine casing and 11 is a coil-shaped scroll in the outer periphery of the turbine casing 10. Number 12 is a turbine rotor, which is supported on a center casing, in such a way that it is free to rotate, by bearings (not pictured). The rotor is coaxial with the compressor (also not pictured).

Number 2 is a nozzle vane, a number of which are arranged in spaces along the circumference of the turbine on the inner periphery of the scroll 11. Nozzle shafts 02, on the inner extremity of the nozzle, are supported in nozzle mounts 4, which are fixed to the turbine casing 10, in such a way that they are free to rotate so that the angle of the nozzle vane varies. Number 14 is a gas exhaust casing which guides the exhaust gases out of the engine once the gases have completed the work of expanding to drive the turbine rotor 12. The gas exhaust casing is fixed to the turbine casing 10.

Number 3 is a disk-shaped link plate. It is supported by the turbine casing 10 in such a way that it is free to rotate. Indentations 3a are provided along the periphery in which levers 1, which will be discussed shortly, can engage. Number 07 is an actuator which drives nozzle vanes 2 through the link plate 3. 005 is a lever which connects actuator rod 7 of the actuator 07 to the link plate 3.

FIGS. 6 and 7 show how the link plate 3, levers 1, and nozzle vanes are assembled. The indentations (oblong holes) 3a are provided on the inner periphery of the disk-shaped link plate 3 at regular intervals along the circumference of the turbine. Bosses 01, formed on the outer extremities of levers 1, engage in the indentations (oblong holes) 3a in such a way that they can rotate and scrape the surface of the indentation. The nozzle shaft 02 of each aforesaid nozzle vane 2 is fixed to the inner extremity of one of the levers 1.

In this sort of variable-capacity turbine, the reciprocating displacement of the actuator 07 is transmitted to the link plate 3 by way of actuator rod 7 and lever 005 of the crank mechanism, thus driving the rotation of the link plate 3. When the link plate 3 rotates, the bosses 01 of the levers 1 which are engaged in indentations 3a of the link plate 3 move along the circumference of the link plate. Nozzle shafts 02, which are fixed to the interior extremities of the levers 1, rotate. This causes nozzle vanes 2 to rotate, changing the vane angle.

In the variable-capacity turbine pictured in FIGS. 5 and 6, bosses 01 on the outer extremities of levers 1 engage in indentations 3a, which are provided on the inside of disk-shaped link plate 3 at regular intervals along the circumference of the turbine. The nozzle shafts 02 of nozzle vanes 2 are fixed to the interior extremities of the levers 1.

With this existing design, then, each link plate 3, lever 1 and nozzle vane 2 are all arranged in virtually the same plane in a radial direction toward the center, and at regular intervals along the circumference of the turbine. As a result, the outer diameter of the variable nozzle mechanism which consists of the link plate 3, lever 1 and nozzle vane 2 is quite large, with the result that it is difficult to fit the variable nozzle mechanism at the inner side of scroll 11 in turbine casing 10. Thus the variable nozzle mechanisms must be placed in the center casing in which the bearing for turbine rotor 12 is mounted. The more the variable nozzle mechanism protrudes from scroll 11 in the axial direction and ends up in the center casing, the longer the axial dimension of the variable-capacity turbine. This increases the size of the variable-capacity turbine and makes it more difficult to install in an automobile.

With this sort of existing design, the nozzle adjustment and drive mechanisms, which comprise a complicated series of links, are housed in the center casing where the bearing and seals are installed. This complicates the design of the center casing, resulting in more assembly and disassembly processes and making installation more difficult.

SUMMARY OF THE INVENTION

In view of the problems which occur with the prior art design, the objective of this invention is to provide a variable-capacity turbine in which the nozzle adjustment mechanism, comprising a link plate serving as the drive component and a lever and nozzle vane serving as the connector mechanism, would all be housed at the inner side of the scroll in the turbine casing. This would reduce the axial length of the turbine and make it more compact, and thus easier to install in a car. It would also avoid the problem of the center casing becoming too complex. There would be fewer assembly and disassembly processes, and the turbine would be easier to install.

To solve these problems, the invention of a first preferred embodiment comprises a variable-capacity turbine which has a coil-shaped scroll in the turbine casing, a number of nozzle vanes which are arranged along the circumference of the turbine at the inner peripheral side of the scroll, which are supported on the turbine casing in such a way that they can rotate, and which vary the vane angle, and a turbine rotor which rotates freely on the inner periphery of the nozzle vanes. The operating gases are made to flow from the scroll through the nozzle vanes to the turbine rotor, driving the rotation of the rotor. This variable-capacity turbine is distinguished by the following. The turbine has a nozzle adjustment mechanism having a nozzle drive member for the nozzles which is connected to an actuator that causes the nozzle drive member to rotate around the turbine shaft, and a plurality of connectors to link the nozzle drive member to the nozzle vanes. The nozzle adjustment mechanism, which comprises the nozzle drive member and the connectors, is installed in the link chamber provided inside the scroll, and the link chamber providing the nozzle adjustment mechanism is gas sealed against the operating gas chamber and is provided at the gas outlet side of the nozzle vanes.

The nozzle drive member may consist of a disk-shaped link plate, the link plate having a series of oblong holes along the circumference of the turbine shaft, and the oblong holes being provided at a specified angle with respect to a radial line which passes through the turbine shaft. The connectors are provided between the nozzle vanes and the disk-shaped link plate along the circumference of the turbine shaft. The connectors consist of levers, one end of which is fixed to one of the nozzle vanes, and the other end of which has a boss on it. This boss engages in the oblong holes in the nozzle drive mechanism in such a way that it can rotate and slide along the surface of the holes.

The invention second preferred embodiment is distinguished by the following. The nozzle drive member consists of a disk-shaped link plate, and the link plate has a series of oblong holes along the circumference of the turbine shaft, and the oblong holes are provided at a specified angle with respect to a radial line which passes through the turbine shaft. The connectors consist of levers which are provided at the gas outlet side of the disk-shaped link plate, one end of which is fixed to one of the nozzle vanes, and the other end of which has a boss on it. This boss engages in the oblong holes in the nozzle drive mechanism in such a way that it can rotate and slide along the surface of the holes.

With these embodiments, the lever and link plate, which form the nozzle adjustment mechanism, are arranged in a link chamber which is further inside the turbine than the scroll, and the mechanism is provided at the gas outlet side of the nozzle vanes. This arrangement allows the lever and link plate of nozzle adjustment mechanism to be placed further inside the turbine than the scroll without requiring that the exterior diameter of the scroll be increased. The axial length of the nozzle adjustment mechanism is contained almost entirely within the diameter of the scroll. Thus the axial dimension of the variable-capacity turbine is shorter than in prior art designs, allowing the supercharger to be made more compact.

Further, as has been discussed above, the nozzle adjustment mechanism is placed further inside the turbine than the scroll, so it need not, as in prior art designs, be made to fit into the center casing where the bearing and seal mechanism are installed. This avoids complicating the design of the center casing, reduces the number of assembly and disassembly processes needed, and makes the turbine easier to install.

Also, as we have discussed, bosses of arm-like levers engage in oblong holes of the link plate, which is set at a fixed angle with respect to a radial line passing through the turbine shaft. The reacting force on the actuator caused by the gas pressure, which depends on the nozzle vanes and the frictional force experienced by the various components of the nozzle adjustment mechanism, can be reduced without increasing the arm length of the lever. As has been discussed, the axial dimension of nozzle adjustment mechanism can easily be made to fit within the scroll. This allows the length of the axial dimension of the variable-capacity turbine to be reduced so that the supercharger can easily be made more compact.

In the second preferred embodiment of this invention, one end of lever has a boss which protrudes toward the link plate, that is, it protrudes inward (toward the link plate). The link mechanism which connects the link plate to actuator is arranged inside along the axial line of the turbine. This allows the total length of the turbine to be reduced so that the turbine can be made more compact.

In these drawings, 1 is a lever, 2 is a nozzle vane, 02 is a nozzle shaft, 3 is a disk-shaped link plate, 03 are oblong holes, 4 is a nozzle mount, 05 is a connection, 6 are bosses, 7 is an actuator rod, 07 is an actuator, 10 is a turbine casing, 11 is a coil-shaped scroll, 12 is a radial-flow turbine rotor, 13 is a link chamber, and 100 is a nozzle adjustment mechanism.

DETAILED DESCRIPTION OF THE PREFERRED EMBODIMENTS

In this section we shall explain several preferred embodiments of this invention with reference to the appended drawings. Whenever the shapes, relative positions and other aspects of the parts described in the embodiments are not clearly defined, the scope of the invention is not limited only to the parts shown, which are meant merely for the purpose of illustration.

Figure 1:
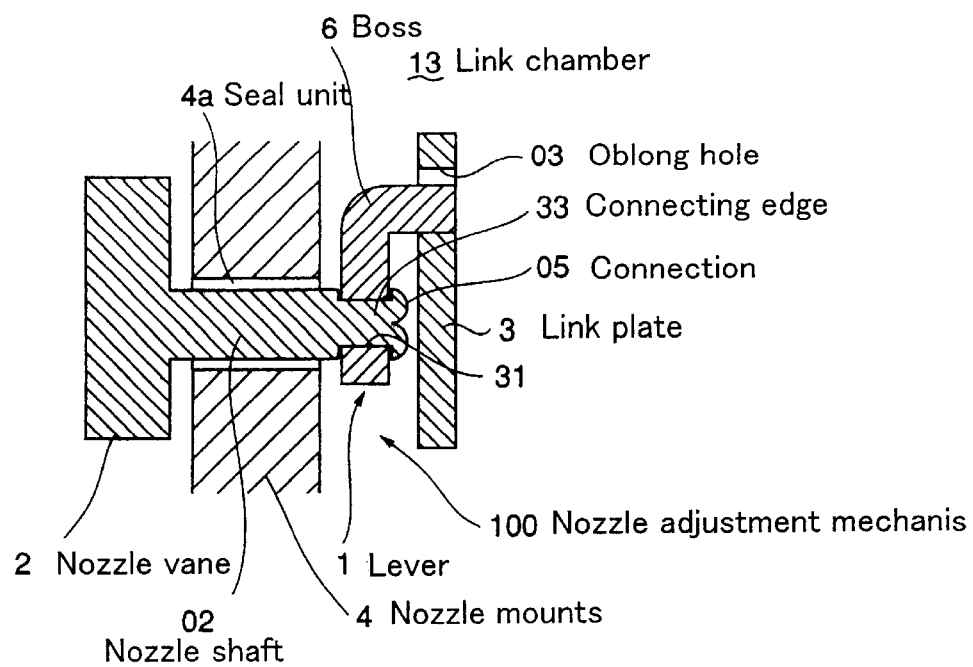
FIG. 1 is a cross section of essential parts of a nozzle adjustment mechanism in a supercharger with a variable-capacity turbine which relates to a first preferred embodiment of this invention.
Figure 2:
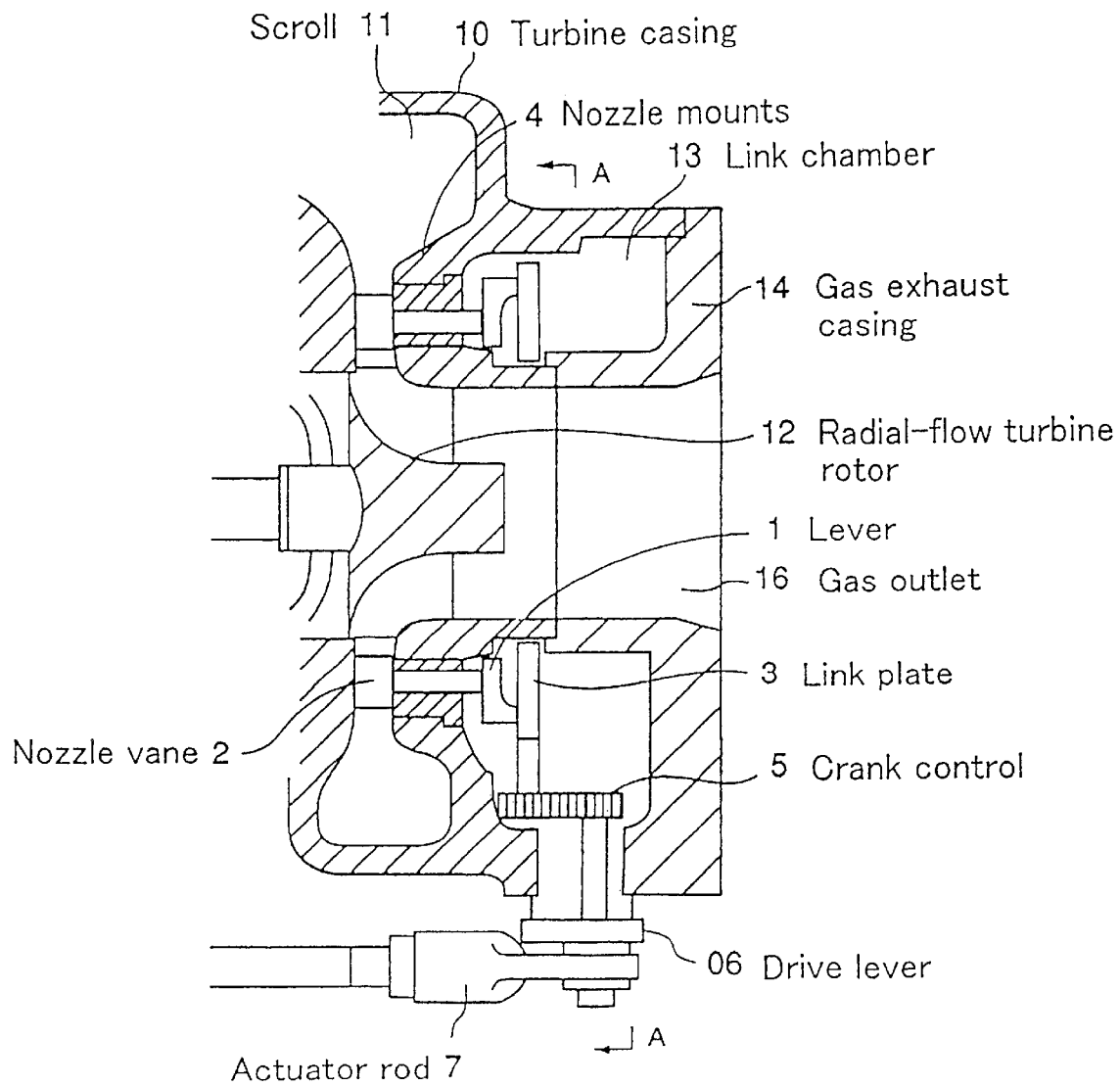
FIG. 2 is a cross section taken along a shaft of the variable-capacity turbine of FIG. 1.
Figure 3:
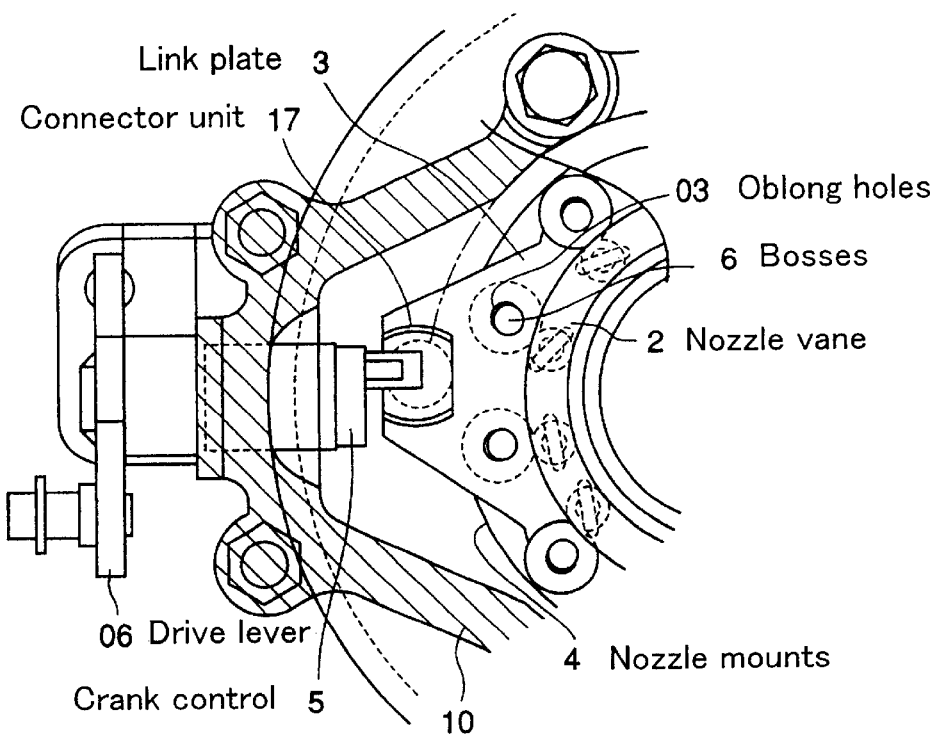
FIG. 3 is a cross section taken along line A in FIG. 2.
Figure 4:
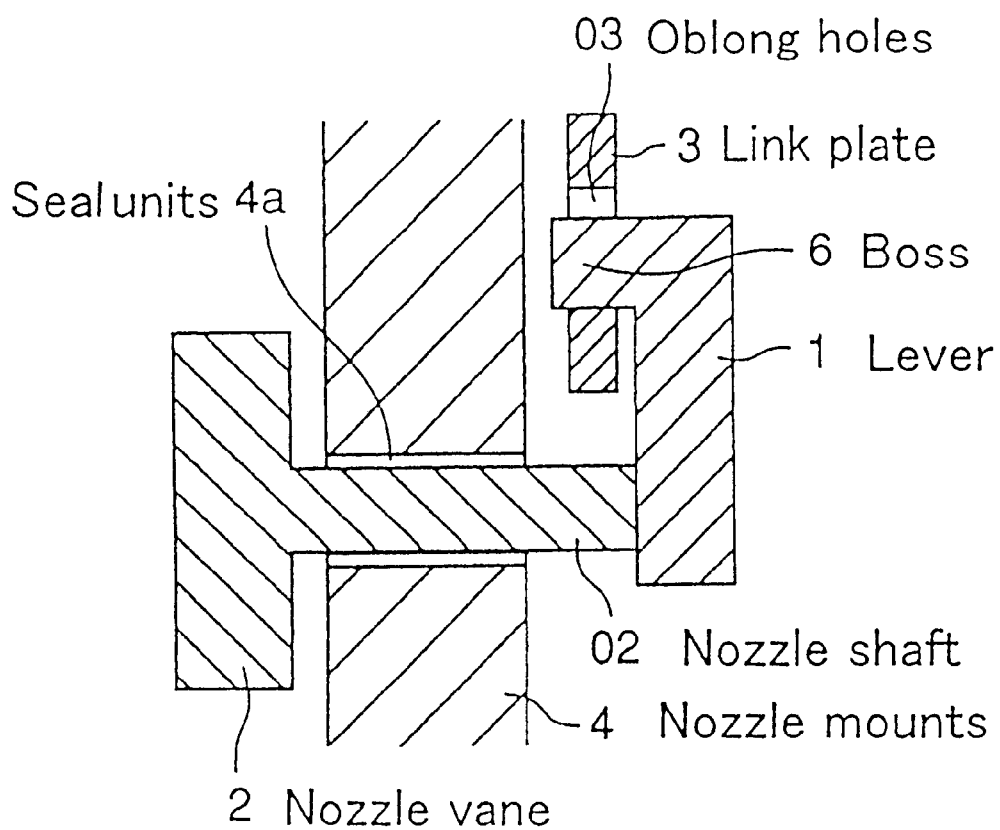
FIG. 4 is a view of a second preferred embodiment similar to FIG. 1.
Figure 5:
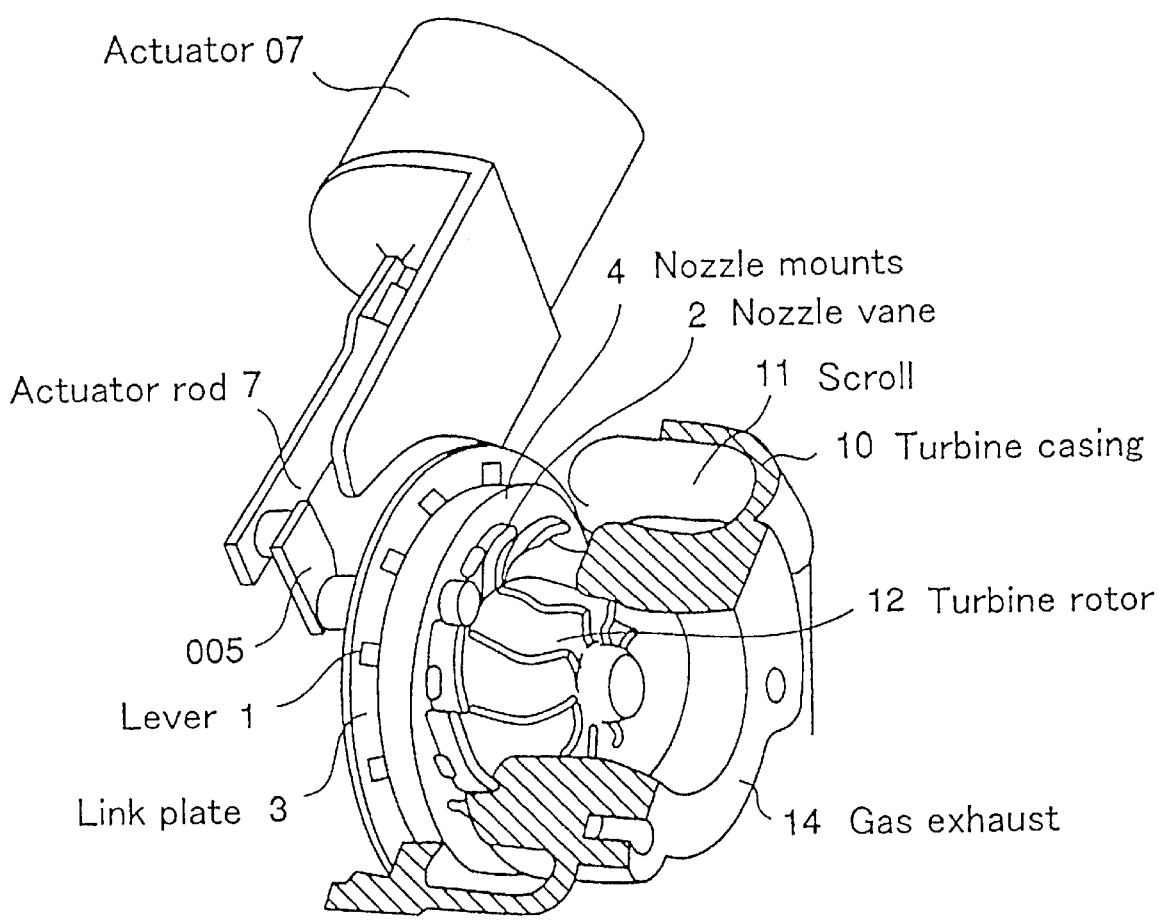
FIG. 5 shows an example of a supercharger with a variable-capacity turbine belonging to the prior art.
Figure 6:
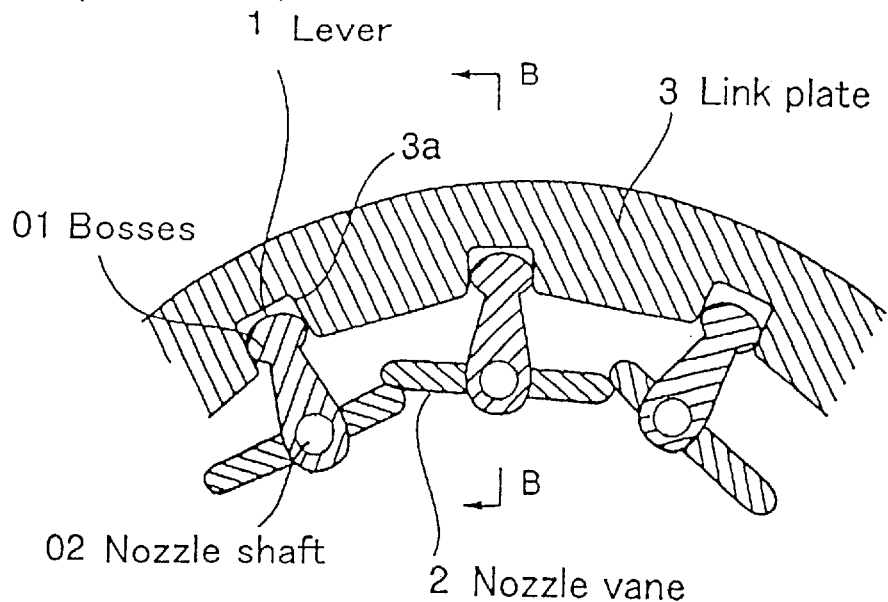
FIG. 6 is a partial frontal cross section of FIG. 5 (taken at a right angle with respect to the shaft of the turbine).
Figure 7:
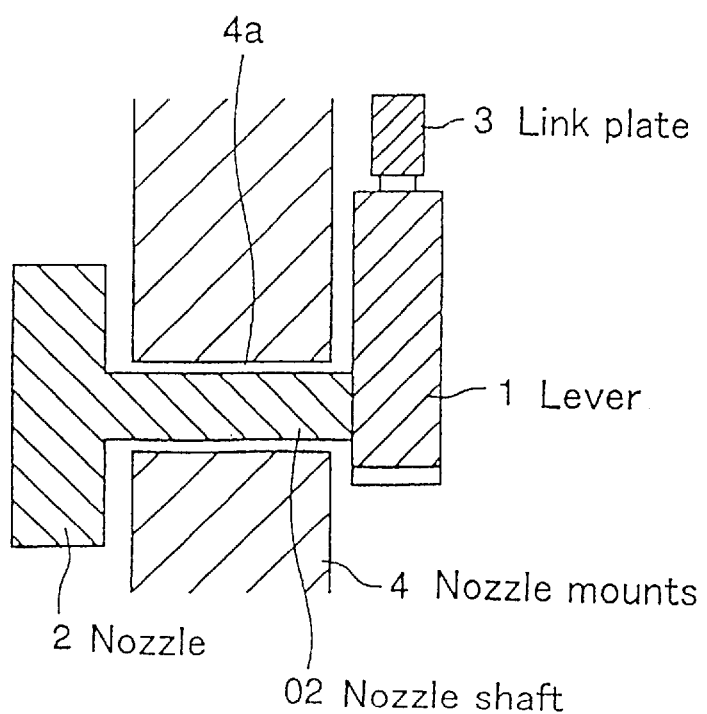
FIG. 7 is a cross section taken along line B in FIG. 6.

FIG. 1 is a cross section of the essential parts of the nozzle adjustment mechanism in a supercharger with a variable-capacity turbine which relates to the first preferred embodiment of this invention. FIG. 2 is a cross section taken along the shaft of the variable-capacity turbine of the first embodiment. With regard to FIG. 2, the portions belonging to the prior art are shown in FIG. 5. FIG. 3 is a cross section taken along line A in FIG. 2. FIG. 4 is a view of the second preferred embodiment, but corresponds to FIG. 1.

In FIGS. 2 and 3, 10 is the turbine casing and 11 is the coil-shaped scroll on the outer periphery of the turbine casing 10. 12 is a radial-flow turbine rotor. This rotor is coaxial with the compressor, which is not pictured. It is supported in the center casing by bearings (neither of which is shown) in such a way that it is free to rotate.

2 is a nozzle vane. A number of these vanes are provided along the inside of the scroll 11 at regular intervals along the circumference of the turbine. Nozzle shaft 02, which is on the vane end of the nozzle, is supported, in such a way that it is free to rotate, by nozzle mount 4, which is fixed to the turbine casing 10. The angle of the vane can be varied by a means which will be described shortly. 14 is a casing through which the gases can escape. It is a channel fixed to the turbine casing 10 to lead the exhaust gases, once they have been expanded and have acted on the turbine rotor 12, outside the turbine. 16 is the gas outlet for the gases.

3 is the disk-shaped link plate, which is supported by the turbine casing 10 in such a way that it can rotate. Oblong holes 03, in which bosses 6 on lever 1 (which will be described shortly) engage, are provided at regular intervals along the circumference of the turbine. The center lines of the oblong holes 03 are at a fixed angle with respect to a radial line which passes through the shaft of the turbine. This reduces the transfer resistance of the drive force from link plate 3 to lever 1.

7 is the actuator rod, which is the output end of actuator 07 (See FIG. 5), the component which drives the nozzle vanes 2. The reciprocating motion of the actuator rod 7 is converted to rotation by connector mechanism 17, which comprises drive lever 06, crank control 5 and a ball joint, and transmitted to the link plate 3.

In FIG. 1, which shows the nozzle adjustment mechanism that is the essential point of this invention, 100 is the nozzle adjustment mechanism. It has the following configuration.

3 is the disk-shaped link plate. As has been described in FIGS. 2 and 3, it is connected to actuator rod 7 through connecting mechanism 17, crank control 5 and drive lever 06, so that it rotates on the turbine shaft. Oblong holes 03 are provided at regular (or irregular) intervals along the circumference of the turbine. 2 is the nozzle vane, a number of which are arranged at regular intervals along the circumference of the turbine on the inside of the scroll 11. Nozzle shaft 02, which is on the vane end of the nozzle, is supported by the nozzle mount 4, in such a way that it can rotate, through seal unit 4*a*, which forms a gas seal for the interior of the link chamber 13. One end of each of the levers 1 is fixed via connection 05, using caulking or the like, to the end of the nozzle shaft 02 opposite nozzle vane 2. Bosses 6, which are formed on the other end of the levers 1, engage in oblong holes 03 of the link plate 3 in such a way that they can rotate and slide along the inner surface of the hole.

As shown in FIG. 2, the lever 1 and link plate 3 are arranged as follows. Lever 1 is placed between the nozzle vane 2 and link plate 3 in link chamber 13, which is further inside the scroll 11. These parts are provided at the gas outlet side of the nozzle vanes.

In a supercharger with a variable-capacity turbine configured as described, the exhaust gas from an internal combustion engine (not pictured) enters the scroll 11, travels through the coil of the scroll 11, and flows into nozzle vane 2. The exhaust gas flows past the vane space of the nozzle vane 2. From the periphery, it flows into the turbine rotor 12, moving toward the center of the rotor. After the expanding gas has acted on the turbine rotor 12, the gas flows out in the axial direction, is guided into gas outlet 16 and is exhausted to the exterior.

To control the capacity in such a variable-capacity turbine, the vane angle of the nozzle vane 2 is set by a control means (not pictured) with respect to the actuator 07 so that the flow rate of the exhaust gas moving through the nozzle vane 2 is the rate desired. The reciprocating displacement of actuator 07 which corresponds to a given vane angle is converted to rotation by connector unit 17, which consists of the actuator rod 7, drive lever 06, crank control 5 and a ball joint, and transferred to the link plate 3, driving the rotation of the link plate.

As the link plate 3 rotates, the bosses 6 of the levers 1 which engage in oblong holes 03 of the link plate 3 proceed along the periphery, rotating and sliding along the inner surfaces of the oblong holes 03. As bosses 6 move, the nozzle shafts 02 are made to rotate via the arm-like levers 1, the bases of which are fixed to the nozzle shafts 02. Thus nozzle vanes 2 rotate, and the actuators 07 vary the vane angles.

With this embodiment, lever 1 and link plate 3, which form the nozzle adjustment mechanism 100, are arranged in link chamber 13, which is further inside the turbine than the scroll 11, and the mechanism is provided at the gas outlet side of the nozzle vane 2. This arrangement allows lever 1 and link plate 3 of nozzle adjustment mechanism 100 to be placed further inside the turbine than the scroll 11 without requiring that the exterior diameter of scroll 11 be increased. The diameter of the nozzle adjustment mechanism 100 is contained almost entirely within the diameter of the scroll 11. Thus the axial dimension of the variable-capacity turbine is shorter than in prior art designs, allowing the supercharger to be made more compact.

Further, as has been discussed above, nozzle adjustment mechanism 100 is placed further inside the turbine than scroll 11, so it need not, as in prior art designs, be made to fit into the center casing where the bearing and seal mechanism are installed. This avoids complicating the design of the center casing, reduces the number of assembly and disassembly processes needed, and makes the turbine easier to install.

Also, as we have discussed, bosses 6 of arm-like lever 1 engage in oblong holes 03 of link plate 3, which is set at a fixed angle with respect to a radial line passing through the turbine shaft. The reacting force on the actuator 7 caused by the gas pressure, which depends on the nozzle vanes 2 and the frictional force experienced by the various components of the nozzle adjustment mechanism 100, can be reduced without increasing the arm length of the lever 1. As has been discussed, the axial dimension of nozzle adjustment mechanism 100 can easily be made to fit within the scroll 11. This allows the length of the axial dimension of the variable-capacity turbine to be reduced so that the supercharger can easily be made more compact.

In the second preferred embodiment of this invention shown in FIG. 4, lever 1 is provided at the gas outlet side of the disk-shaped link plate. One end of lever 1 is fixed to the nozzle vane 2. The other end, which has a boss 6 on it, protrudes toward the link plate 3, that is, it protrudes inward (toward link plate 3). This boss engages in oblong holes 03 in the link plate 3 in such a way that it can rotate and slide along their surface.

All other aspects of the configuration are as in the first embodiment. Identical components have been given the same numbers.

With this embodiment, link plate 3 is placed inside lever 1 so that it is quite close to nozzle mount 4. Thus connector unit 17, which consists of drive lever 06, connected to the link plate 3, crank control 5 and a ball joint, and the link mechanism which connects to actuator 07 of actuator rod 7, are all arranged inside, along the axial line of the turbine. This allows the total length of the turbine to be reduced so that the turbine can be made more compact.

As already explained in these preferred embodiments, the nozzle drive components and the plurality of connectors, which form the nozzle adjustment mechanism 100, are arranged in the link chamber, which is further inside the turbine than the scroll, and the mechanism is provided at the gas outlet side of the nozzle vane. This arrangement allows the nozzle adjustment mechanism to be placed further inside the turbine than the scroll without requiring that the exterior diameter of scroll be increased. The diameter of the nozzle adjustment mechanism is contained almost entirely within the diameter of the scroll. Thus the axial dimension of the variable-capacity turbine is shorter than in prior art designs, allowing the supercharger to be made more compact, and easier for installing in an automobile.

Further, as has been discussed above, the nozzle adjustment mechanism is placed further inside the turbine than scroll, so it need not, as in prior art designs, be made to fit into the center casing where the bearing and seal mechanism are installed. This avoids complicating the design of the center casing, reduces the number of assembly and disassembly processes needed, and makes the turbine easier to install.

Also, as we have discussed, the bosses of the arm-like lever engage in oblong holes of link plate, which is set at a fixed angle with respect to a radial line passing through the turbine shaft. The reacting force on the actuator caused by the gas pressure, which depends on the nozzle vanes and the frictional force experienced by the various components of the nozzle adjustment mechanism, can be reduced without increasing the arm length of the lever. As has been discussed, the axial dimension of nozzle adjustment mechanism can easily be made to fit within the scroll. This allows the length of the axial dimension of the variable-capacity turbine to be reduced so that the supercharger can easily be made more compact.

In the second preferred embodiment of this invention, the lever is provided at the gas outlet side of the disk-shaped link plate and the link mechanism which connects to actuator 07 of actuator rod 7 is arranged inside, along the axial line of the turbine (resulting in a shorter length along the axial line). This allows the total length of the turbine to be reduced so that the turbine can be made more compact.

What is claimed is:

1. A variable-capacity turbine, comprising:
   a coil-shaped scroll in a turbine casing;
   a plurality of nozzle vanes arranged along a turbine circumference at an inner peripheral side of said scroll, said plurality of nozzle vanes being supported on said turbine casing so as to be rotatable to vary a vane angle of said plurality of nozzle vanes;
   a turbine rotor on an inner periphery of said plurality of nozzle vanes and having a turbine shaft, said turbine rotor being freely rotatable by operating gases which flow from said scroll through said plurality of nozzle vanes; and
   a nozzle adjustment mechanism comprising a nozzle drive member connected to an actuator, said actuator being actuatable to rotate said nozzle drive member around an axis of said turbine shaft, and a plurality of connectors linking said nozzle drive member to said nozzle vanes;
   wherein said nozzle adjustment mechanism is a link chamber one the inner side of said scroll, said link chamber is sealed with respect to the operating gases which flow from said scroll through said plurality of nozzle vanes, and said nozzle adjustment mechanism is provided at a gas outlet side of said nozzle vanes;
   wherein said nozzle drive member comprises a disk-shaped link plate having a plurality of oblong holes at a specified angle with respect to a radial line passing through the axis of said turbine shaft, said oblong holes being closed at a radially outer peripheral side of said disk-shaped link plate; and
   wherein said plurality of connectors are provided between said nozzle vanes and said disk-shaped link plate and circumferentially about the axis of said turbine shaft, said plurality of connectors comprising levers each of which has one end fixed to a respective one of said plurality of nozzle vanes and an other end having a boss which engages in a respective one of said oblong holes such that said disk-shaped link plate can rotate with said boss sliding on an inner surface of the respective one of said oblong holes;
   wherein said boss of each of said levers protrudes therefrom in a direction parallel to the axis of said turbine shaft and toward said plurality of nozzle vanes such that said disk-shaped link-plate is axially positioned between said plurality of levers and said plurality of nozzle vanes.

2. A variable-capacity turbine, comprising:
   a coil-shaped scroll in a turbine casing;
   a turbine rotor rotatable by operating gases which flow from said scroll;
   a plurality of nozzle vanes arranged between said scroll and said turbine rotor, said plurality of nozzle vanes being adjustable to vary a vane angle of said plurality of nozzle vanes; and
   a nozzle adjustment mechanism comprising a disk-shaped link plate having a plurality of oblong holes at a specified angle with respect to a radial line passing through an axis of a turbine shaft, said oblong holes being closed at a radially outer peripheral side of said disk-shaped link plate, and a plurality of connectors linking said disk-shaped link plate to said nozzle vanes;
   wherein said plurality of connectors comprise levers each of which has one end fixed to a respective one of said plurality of nozzle vanes and an other end having a boss which engages in a respective one of said oblong holes such that said disk-shaped link plate can rotate with said boss sliding on an inner surface of the respective one of said oblong holes;
   wherein said boss of each of said levers protrudes therefrom in a direction parallel to the axis of said turbine shaft and toward said plurality of nozzle vanes such that said disk-shaped link-plate is axially positioned between said plurality of levers and said plurality of nozzle vanes.

* * * * *